July 26, 1966  W. D. STAHL  3,263,175
PULSE GATE CIRCUIT INHIBITING TRANSMISSION WHEN BLOCKING
SIGNAL COINCIDES WITH INPUT SIGNAL
Filed April 2, 1964  2 Sheets-Sheet 1

INVENTOR
WILLIAM D. STAHL
BY
Robert L. Slater Jr.
ATTORNEY

United States Patent Office 3,263,175
Patented July 26, 1966

3,263,175
PULSE GATE CIRCUIT INHIBITING TRANSMISSION WHEN BLOCKING SIGNAL COINCIDES WITH INPUT SIGNAL
William D. Stahl, Northfield, Ill., assignor to Radiation Instrument Development Laboratory, division of Nuclear-Chicago Corporation, Melrose Park, Ill., a corporation of Delaware
Filed Apr. 2, 1964, Ser. No. 356,849
2 Claims. (Cl. 328—99)

This invention relates to pulse gating circuits and more particularly, to an improved linear gate for the prevention of spectral distortion in a multi-channel pulse height analyzer.

In many areas of investigation it is necessary to derive information from the analysis of complex electrical signals by sorting the electrical signals according to the amplitudes of the individual pulses which comprise the total signal. Such electrical signals may be derived from studies in radioactivity wherein the events which occur randomly in time are converted to discrete time separated electrical pulses having an analog or amplitude proportional to the events under investigation. A multi-channel pulse height analyzer can be used to sort the electrical pulses into arbitrary categories, each of which corresponds to data pulses having upper and lower amplitude levels which fall within certain predetermined ranges. The number of pulses which occur within each range of amplitude limits can be counted and the resulting information displayed as a spectrum of the number of pulses versus the energy content of the pulses can yield useful information upon observation.

Multi-channel pulse height analyzers can operate at relatively high counting rates, but spectral distortion becomes more significant as the counting rate is increased. The reason for the increased probability of distortion is that the analyzer pulse data processing circuits are usually adapted to handle each pulse individually and must be isolated or gated off from a new input pulse until the pulse being analyzed is properly processed during a given discrete time separated interval. The processing time interval of the analyzer for each pulse is usually referred to as the dead time. If a new input data pulse should arrive during the analysis or processing time of a previous pulse, the energy of the new pulse might be added to the preceding pulse and a corresponding error in the analysis of the first pulse would be recorded. Therefore, it is necessary to gate the input of the pulse analyzer to prevent spectral distortion as a result of the analysis of a pulse following too closely after a preceding pulse. It is also possible that in the event a pulse should arrive during the dead time interval of the analyzer, that it to say, in that interval when the pulse analysis circuits are busy processing a particular pulse, a portion of the pulse, corresponding to the decay or tail of the pulse might be gated into the analyzer if the analyzer should become receptive as, for example, if the busy signal should be suddenly removed before the pulse has decayed to the baseline. In the foregoing event the analyzer would see a portion of the pulse which would, in turn, not correspond to the bonafide pulse peak value if the entire bonafide pulse, including the energy peak was analyzed.

These is yet another way in which spectral distortion can ocur which corresponds to the event in which a relatively small pulse occurs shortly after a previous relatively large pulse has appeared at the input of the analyzer. For purposes of illustration it can be assumed that the aforesaid first pulse was too large to be accepted within the range set by an upper amplitude discriminator. The aforesaid second smaller pulse might fall within the range of acceptability of the upper amplitude discriminator setting, but is riding on the tail or decay time of the first larger pulse and will, therefore, not be analyzed accurately. Thus the amplitude of the second smaller pulse is not bonafide for it can readily be seen that the first pulse tail provides a false baseline for the second pulse. The foregoing event results in spectral distortion if the second pulse is allowed to enter the pulse analysis circuitry. Stated in another way, spectral distortion can be defined as the improper cataloging of data pulses into categories which do not correspond to the bonafide values of the analog amplitudes of the individual data pulses.

It is, therefore, a principal object of the present invention to provide an improved pulse gating circuit which will overcome the above mentioned disadvantages.

It is another object of the present invention to provide an improved linear gate for the prevention of spectral distortion in a multi-channel pulse amplitude analyzer.

A further object of the present invention is to provide a fully solid-state linear gate to prevent the passage of false or distorted pulses into the input of a multi-channel pulse amplitude analyzer.

It is yet another object of the present invention to provide an improved linear pulse gating circuit that provides logic and memory features which permit the gate to accept and pass only bonafide pulses into subsequent pulse amplitude analysis circuitry.

Other objects and advantages of my invention will become apparent from the following specification when considered in connection with the accompanying drawings and in which.

Figure 1:
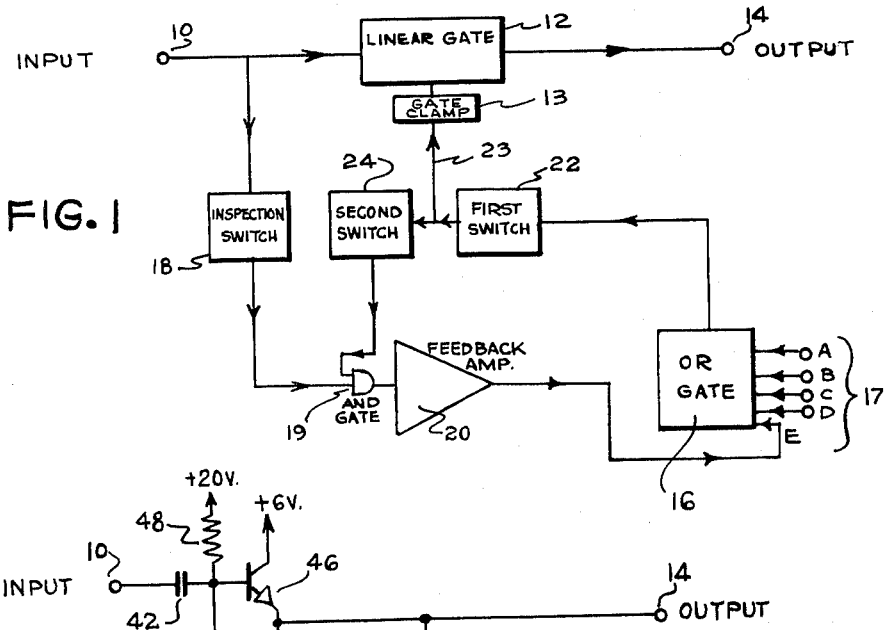
FIGURE 1 is a schematic diagram in block form of a pulse gating circuit in accordance with the present invention.

Referring now to FIGURE 1 there is shown a pulse gating circuit in accordance with the present invention in which a linear data pulse gate 12 is interposed between pulse gate circuit input and output terminals respectively, 10 and 14. The input is adapted to receive data pulses which are typically derived from a linear pulse amplifier, input signals which in turn, may be derived from a nuclear scintillation counter. Visible light scintillations in a scintillation counter are converted to electrical wave forms by means of a photo multiplier tube to form the data voltage pulses. The data voltage pulses derived from a scintillation counter are proportional in amplitude to the energy contained within the exciting nuclear particles as they activate the scintillation device. The foregoing circuits and components are well known in the art and therefore, details of their construction and operation are not shown for the sake of brevity. The data pulses derived from a linear pulse amplifier are typically negative going pulses having a rise time of approximately 0.5 microsecond or less, and having a decay time constant or pulse tail of approximately one microsecond.

A diode logic OR gate 16 is provided with a plurality of inputs 17, adapted to respond to negative going pulses with an amplitude of approximately minus 6 volts and which may be derived from other circuits in the pulse amplitude analyzer. Typically, such circuits would include an upper level amplitude discriminator, a coincidence input, a busy signal and other miscellaneous and auxiliary gate control signals. Each of the foregoing OR gate input logic pulse signals corresponds to a condition or state in the auxiliary pulse amplitude analyzer circuits which requires that the gate be closed to prevent the passage of a pulse from the input to the output terminals.

The output of the OR gate 16 is connected to a first switch 22 which closes the linear gate 12 upon receipt of an input pulse at any of the OR gate inputs and at the same time actuates a second switch 24 which is connected to a current summation junction AND gate 19 at the input of a feedback amplifier 20. The output of the feedback amplifier 20 is connected to one of the inputs E of the OR gate 16 and provides a pulse, under certain conditions which will subsequently be explained, which actuates the OR gate and, in turn, clamps the linear gate 12 closed through switch 22, control lead 23, and gate clamp 13. A pre-gate inspection switch 18 is connected between the input of the linear gate 10 and the current summation junction AND gate 19 at the input of the feedback amplifier 20.

To illustrate the operation of the aforedescribed circuit when a typical input data pulse appears at the input of the gate, the following conditions prevail: It is assumed that there is initially no logic signal at any of the OR gate inputs. Thus, switch 22 is open and the linear gate 12 is unclamped and open to permit the passage of the data pulse through the linear gate 12 and to output terminal 14. The current summation junction AND gate 19 at the input of the feedback amplifier 20 functions as follows: Although the presence of any input data pulse actuates the inspection switch 18, the signal thus derived from the output of the inspection switch is insufficient to actuate the feedback amplifier in the absence of a concommitant signal from switch 24, which, in turn, would only result from the presence of an input logic pulse at any of the OR gate inputs 17A, B, C, D, E.

Consider now the case if the linear gate 12 should be closed as a result of switch 22 being actuated by the presence of an input logic pulse appearing through any of the OR gate 17 inputs. If, during the time the linear gate 12 is closed, a data pulse should appear at the input terminal 10, it will not be permitted to pass into the subsequent data analysis circuits through output 14. If, however, the OR gate input signal should be terminated during the period when a portion or fragment of a data pulse appears at the input 10 of the linear gate 12, the inspection switch 18 will, in combination with the output signal from switch 24, provide an output logic signal from the feedback amplifier 20 through the feedback input E of the OR gate 16. Thus, the output signal from the OR gate 16 will hold switches 22 and 24 closed until the input data pulse disappears and inspection switch 18 again opens, removing one of the signals from the AND gate current summation junction at the input of amplifier 20, thereby opening switch 22 which, in turn, unclamps and thereby opens the linear gate 12 by means of the gate clamp 13.

Put in another way, if a data pulse signal appears while the linear gate is closed, a positive feedback signal is generated which keeps the linear gate closed until the data pulse signal decays to a zero reference baseline at the input terminal 10. If, however, a data pulse signal appears when the linear gate 12 is open, the signal will pass through the gate in an undistorted and unimpeded fashion.

Figure 2:
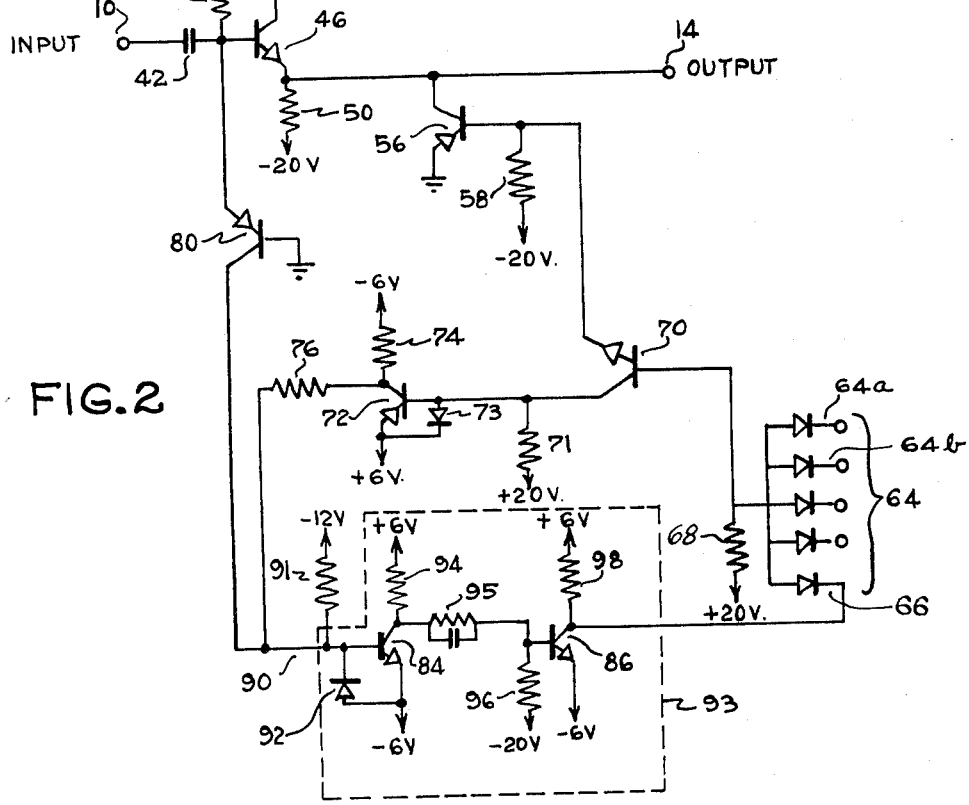
FIGURE 2 is a detailed schematic diagram of a specific embodiment of the circuit represented in block form in FIGURE 1.

Referring now to FIGURE 2, which shows a detailed embodiment of the present invention, the input terminal 10 of the linear gate circuit is coupled to the base of the linear gate NPN transistor 46 through an input coupling capacitor 42. Transistor 46 is connected as an emitter follower and the emitter of transistor 46 is connected directly to the output terminal 14 and is biased through resistor 50 to a minus 20 volt source of D.C. potential. The base of transistor 46 is connected to a plus 20 volt source of D.C. potential through resistor 48. The output of the emitter follower 46 is directly connected to the collector of the gate clamp PNP transistor 56. The emitter of transistor 56 is returned directly to ground. The base of transistor 56 is connected through resistor 58 to a minus 20 volt source of D.C. potential. The base of transistor 56 is also directly connected to the emitter of NPN transistor 70 which functionally corresponds to first switch 22. The collector of transistor 70 is directly connected to the base of PNP transistor 72 which functionally corresponds to second switch 24. The collector of transistor 70 is also connected to a plus 20 volt source of D.C. potential through resistor 71. The emitter of transistor 72 is connected directly to a plus 6 volt source of D.C. potential. The collector of transistor 72 is connected through resistor 74 to a minus 6 volt source of D.C. potential and also connected through resistor 76 to the current summation junction AND gate 90. The base of transistor 72 is clamped to its emitter by means of diode 73.

The OR gate 64 is comprised of a plurality of diodes, the cathodes of each being connected to the OR gate input terminals, one of which is shown at 64a. The cathode of OR gate diode 66 is connected to the output of the feedback amplifier 93, the significance of which will become apparent hereinafter. The anodes of the OR gate diodes are connected together in common and directly connected to the base of transistor 70. When the input signals to the OR gate 64 are all positive, the gate is disabled and 2 milliamperes of negative current will flow through resistor 58 and through transistor 70, causing transistor 72 to conduct. The base of transistor 70 is connected through the resistor 68 to a plus 20 volt source of D.C. potential.

The collector of PNP transistor 80, which corresponds functionally to the inspection switch 18, is directly connected to the current summation junction AND gate 90 and through resistor 76 to the collector of transistor 72. The base of transistor 80 is directly returned to ground. The emitter of transistor 80 is directly connected to the input terminal 10 of the linear gate circuit. The feedback amplifier 93 comprises NPN transistors 84 and 86, respectively. The current summation junction 90 is directly connected to the base of transistor 84, and is also connected through resistor 91 to a minus 12 volt source of D.C. potential. A clamping diode 92 is connected between the base and emitter of transistor 84. The emitter of transistor 84 is directly connected to a minus 6 volt source of D.C. potential. The collector of transistor 84 is connected through resistor 94 to a plus 6 volt source of D.C. potential and through a parallel resistance capacity coupling network 95 to the base of transistor 86. The base of transistor 86 is connected through resistor 96 to a minus 20 volt source of D.C. potential. The emitter of transistor 86 is directly connected to a minus 6 volt source of D.C. potential. The collector of transistor 86 is connected through resistor 98 to a plus 6 volt source of D.C. potential. The collector of transistor 86 is also directly connected to the cathode of the OR gate diode 66.

Figure 3:
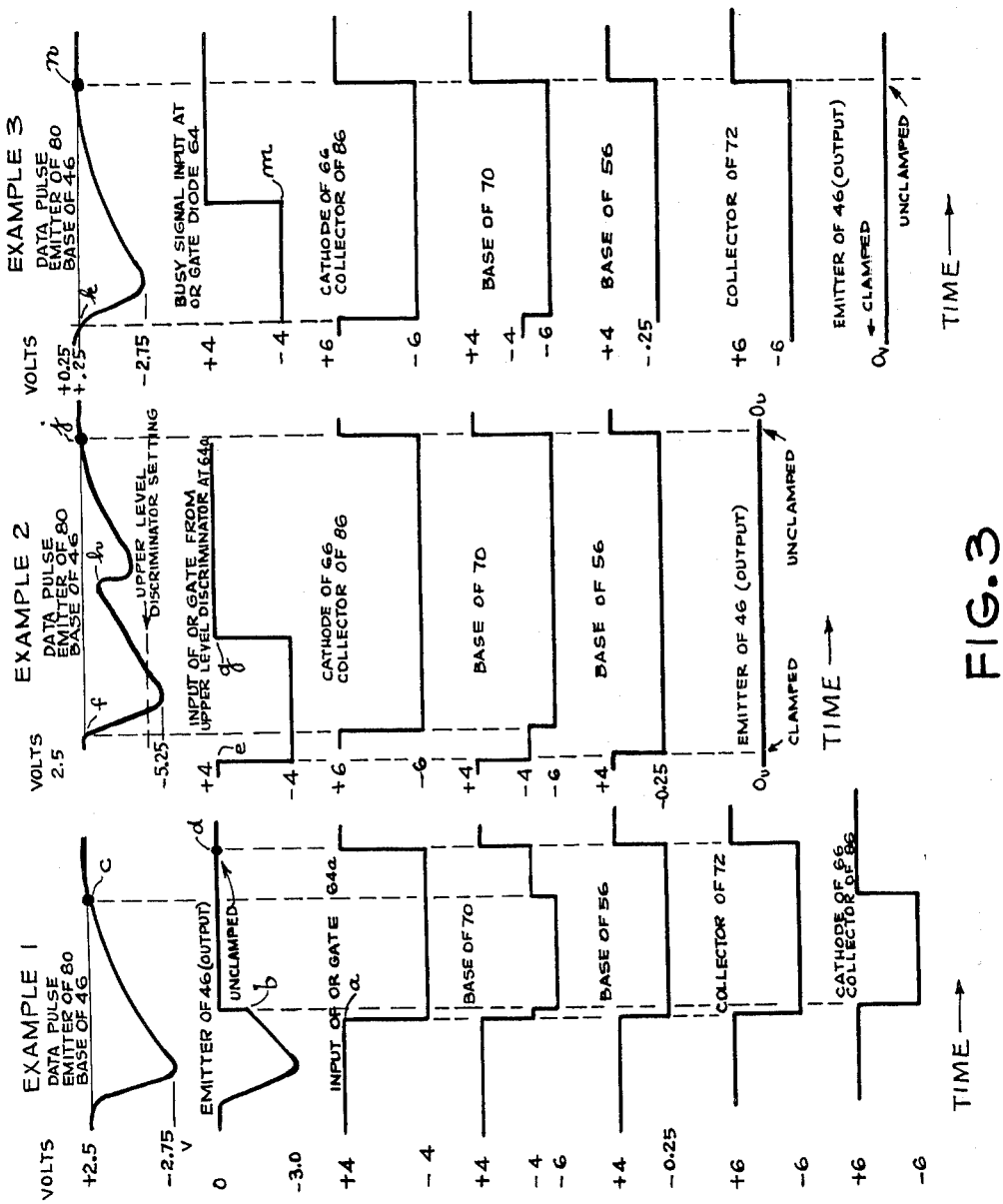
FIGURE 3 is a group of waveforms which illustrate the operation of the pulse gating circuit of FIGURE 2, and in accordance with the present invention.

In order to more fully illustrate the operation of the circuit, representative voltage waveforms generated by the circuit of FIGURE 2 have been chosen for three typical operating conditions in which data pulses may occur in combination with various logic input conditions and which waveforms have been illustrated in FIGURE 3. Reference will now be made to the circuit of FIGURE 2 and the waveforms illustrated in FIGURE 3. Operation of the circuit in Example 1 is as follows:

A data pulse signal is applied to the input terminal 10 and therefore to the emitter of transistor 80 and the base of transistor 46, and appears at the emitter of transistor 46, and at the output terminal 14 in undistorted form during normal operation of the circuit when the gate is open. A logic input signal which enables the OR gate 64 is shown at a and is typically a negative going pulse which swings the cathode of 64a from plus 4 volts to minus 4 volts and which, for purposes of illustration, is shown occurring approximately one microsecond after the start of the input data pulse. Prior to the appearance of the logic pulse at a the base of transistor 70 is biased to approximately plus 4 volts by the current flowing through resistor 68. As a result of the foregoing bias the emitter voltage of transistor 70 is raised to plus 4 volts and therefore, biases the base of transistor 56 to plus 4 volts, which in turn, biases transistor 56 to cut off. With transistor 56 cut off, a very high shunt impendance exists between its collector and emitter, and therefore, the output terminal 14, which is directly connected to the emitter of the linear gate emitter follower transistor 46, is unclamped from ground and hence, follows the voltage excursions of the data pulse signal applied to the base of transistor 46. Simultaneously, transistor 72 is conducting because two milliamperes of collector current flows through transistor 70 and is also the base current of transistor 72. Under the foregoing conditions, the collector of transistor 72 is at plus 6 volts. The collector of transistor 72 is connected to the current summation junction AND gate 90 through resistor 76. When the potential at the collector of transistor 72 is clamped at plus 6 volts by means of diode 73, which is connected between its base and emitter, transistor 72 will provide a first source of 200 microamperes of positive current through resistor 76 to the current summation junction AND gate 90. In the absence of any input data pulse signal at terminal 10, transistor 80 is conducting, and transistor 80 will provide a second source of approximately 200 microamperes of positive current, minus the small base current of transistor 46, which will flow through resistor 48 and through transistor 80 to the current summation junction AND gate 90. It can, therefore, be seen that in the absence of a data input pulse signal and logic input pulse signal, the total current at the current summation junction is +200+200=400 microamperes. Since −100 microamperes flows out of the current summation junction continuously through resistor 91, a net positive current flow of 300 microamperes will then prevail. When the net current flow into the current summation junction AND gate 90 in the foregoing state is positive, the input or base of transistor 84 will be held at approximately plus 6 volts. Under these conditions, the output at the collector of transistor 84 will be plus 6 volts and, in turn, the output at the collector of transistor 86 will also be approximately plus 6 volts. When the output of the feedback amplifier, which can be considered as the signal at the collector of transistor 86, is positive, the OR gate 64 will not be enabled through diode 66. In the event a negative going pulse appears at any of the OR gate inputs 64 other than diode input 66, the gate will be enabled through the diode at that particular input and the base of transistor 70 will be driven to minus 4 volts as shown at $a$. Immediately thereupon the base of transistor 56 will be driven from plus 4 volts to approximately minus 0.25 volt. Hence, transistor 56 will conduct and act as a very low shunt impedance between ground and the emitter or output lead of the linear gate emitter follower transistor 46, thereby in effect clamping the output 14 to ground and closing the gate to prevent passage of any data pulse signal energy. Simultaneously, the base of transistor 72 will swing to plus 6 volts thereby cutting off transistor 72 and thus causing the collector of transistor 72 to swing from plus 6 volts to minus 6 volts. When the collector of transistor 72 swings negative, the first source of 200 microamperes of current, which normally flows through resistor 76 and into the current summation junction 90 when transistor 72 is conducting, will cease to provide current. However, at the instant the input data signal swings negative, transistor 80 is also cut off, thereby eliminating the second source of 200 microamperes of positive current flowing into the current summation junction AND gate 90 through resistor 48 and transistor 80. When both 200 microampere sources of positive current flowing into the current summation junction AND gate 90 are thus eliminated, the 100 microamperes of negative current flowing out of the current summation junction AND gate 90 through resistor 91 will cause the base of transistor 85 to swing negative, thereby causing the collector of transistor 86 to also swing negative and hence, supply a minus 6 volts input signal at OR gate diode 66. The time interval shown between $a$ and $b$ of Example 1 has been exaggerated to more clearly illustrate the aforedescribed action and normally the time interval will be negligible. The base of transistor 70 will be driven slightly further negative at $b$ as a result of the additional negative input signal which appears from the feedback amplifier output transistor 86 through the cathode of diode 66. When the input data pulse decays to the reference base line shown at $c$, transistor 80, functioning as the pre-gate inspection switch and also as a D.C. restorer to define the reference baseline, will again begin to conduct, thereby restoring the second 200 microampere source of positive current flowing into the current summation junction AND gate 90, disabling the AND gate. Thereupon, the output from the feedback amplifier taken from the collector of transistor 86 will swing back to plus 6 volts. At the same time the base of transistor 70 will return to minus 4 volts, but will remain at that potential as a result of the continued application of the minus 4 volt logic pulse through diode 64$a$. When the logic pulse is finally terminated at $d$, the base of transistor 70 returns to plus 4 volts, thereby returning the base of transistor 56 to plus 4 volts which cuts off transistor 56, unclamps the linear gate emitter follower 46, and reopens the linear gate to permit passage of data pulse signal energy. The collector of transistor 72 will now return to plus 6 volts, thereby restoring the first source of 200 microamperes of positive current flowing between the collector of transistor 72 and through resistor 76 into the current summation junction AND gate 90. It can readily be seen from the foregoing description that the current summation junction 90 functions as an AND gate, enabling the non-inverting feedback amplifier 93 to provide a negative logic pulse signal into the OR gate 64 only when both transistor switches 72 and 80 respectively, are simultaneously open, or cut off, thereby eliminating the net positive current flow into the current summation junction AND gate 90.

In considering the operation of the gate circuit as illustrated in Example 2 and of FIGURE 3, it will be assumed that the OR gate 64 has been enabled at time $e$ by the presence of the negative logic pulse from a previous upper level discriminator means, not shown, through diode 64$a$. It is understood that the amplitude of the first input data pulse $f$ exceeds the upper level discriminator setting as shown by the horizontal dashed line which is assumed to be in auxiliary circuits not illustrated herein. Although the first data pulse is illustrated graphically in Example 2 as occurring shortly after the logic pulse from the upper level discriminator, it is understood that the data pulse has been suitably delayed through delay line means which are not illustrated herein for purposes of clarity and simplicity. The presence of a logic pulse signal from the upper level discriminator at $e$ drives the base of transistor 70 to minus 4 volts which, in turn, swings the base transistor 56 from plus 4 volts to approximately minus 0.25 volt, thereby clamping the emitter of transistor 46 to ground and closing the linear gate to the passage of the data pulse signal. As soon as the data pulse signal appears at the input terminal 10, and to the emitter of the pre-gate inspection switch transistor 80, transistor 80 will be rendered non-conductive by the application of the input data pulse signal. The 200 microamperes of positive current which normally flows through transistor 80 when it is in the conducting state and into the current summation junction AND gate 90, will be terminated. At the same time the presence of the logic pulse at $e$ has also terminated the 200 microamperes of positive current which normally flows from the collector of transistor 72 and through resistor 76 into the current summation junction AND gate 90 when transistor 72 is in the conducting state. The AND gate 90 will then be enabled, thus driving the base of transistor 84 negative which, in turn, will produce a negative output signal of minus 6 volts at the collector of transistor 86, and which negative signal will be applied to the cathode of OR gate diode 66. When the amplitude of the first data pulse signal decays below the setting of the aforementioned upper level discriminator means, the logic pulse at the OR gate input 64a from the upper level discriminator means will be terminated as shown at g. However, the gate clamp transistor 56 will continue to clamp the gate closed since the data pulse has not decayed to the reference base line. It can readily be observed now that the current summation junction AND gate is maintained at minus 6 volts by virtue of the fact that transistor 80 is cut off as long as the input data pulse is below the reference base line. The feedback path through the feedback amplifier, comprising respectively, transistors 84 and 86, and through the OR gate input diode 66, maintains the AND gate 90 enabled until the AND gate 90 is disabled by the return of transistor 80 to the conducting state, thereby restoring one of the 200 microampere sources of positive current flowing into the current summation junction AND gate 90. To further illustrate the function of the pre-gate inspection transistor 80 it can be seen that before the first data pulse has decayed to the reference base line, a second and smaller data pulse h is shown to appear at the input terminal 10 of the linear gate. It can now be seen that if the linear gate transistor 46 was unclamped at g when the upper level discriminator logic signal to the OR gate 64 was terminated, and the second smaller pulse h allowed to pass, its value would not be bonafide because it is riding on a portion of the tail or decay time of the first larger pulse f. Because of the action of the pre-gate inspection transistor 80 and the aforedescribed feedback mechanism, the linear gate transistor 46 is clamped closed until the data signal has returned to the reference base line, and the second pulse h will not be permitted to pass through the linear gate emitter follower transistor 46. When the second pulse h has decayed to the reference base line shown at j, transistor 80 will begin to condut, thereby restoring 200 microamperes of positive current into the current summation junction AND gate 90. The base of transistor 84 will now swing positive and the collector of transistor 86 will swing positive, thereby eliminating the negative logic feedback signal at OR gate diode 66 and in the absence of any other OR gate input negative signals, the base of transistor 70 will now swing to plus 4 volts. The base of the gate clamp transistor 56 will swing to plus 4 volts and the emitter of the emitter follower linear gate transistor 46 will thus be unclamped at j and the linear gate will be open to permit the passage of further data pulse signals.

Referring now to Example 3 of FIGURE 3, it will be assumed that an input data pulse k appears at the input terminal 10 while the linear gate transistor 46 is clamped to ground by virtue of the fact that a busy signal logic pulse appears at one of the inputs of the OR gate 64. The base of transistor 70 is initially at minus 4 volts because of the presence of the negative signal at one of the OR gate inputs, illustrated in this case as a busy signal from the auxiliary circuits. Thus, the collector of transistor 72 is at a potential of minus 6 volts, thereby eliminating the first of the two 200 microampere sources of positive current flowing into the current summation junction AND gate 90. When the input data signal pulse shown at k appears, transistor 80 will be cut off and the second source of 200 microamperes of positive current flowing into the current summation junction AND gate 90 will also be eliminated. The AND gate 90 will be enabled and will swing the base of transistor 84 to minus 6 volts causing the collector of transistor 86 to swing to minus 6 volts. The negative signal from the collector of transistor 86 is applied to the OR gate 64 through diode 66 and will enable the OR gate in combination with the busy signal already present through diode 64b as aforedescribed. If, for any reason the busy signal logic pulse at the OR gate 64 and diode 64b is eliminated as shown at m, while the input data pulse signal has not yet returned to the reference base line, the aforedescribed feedback mechanism will hold the emitter of the linear gate emitter follower transistor 46 clamped to ground, thereby holding the linear gate closed until the input data signal has decayed to the reference base line as shown at n. When the data pulse signal returns to the reference base line at n, transistor 80 becomes conductive, thereby restoring 200 microamperes of positive current into the current summation junction AND gate 90. The base of transistor 84 will be driven positive and the collector of transistor 86 will be driven positive, thereby eliminating the negative OR gate input signal through diode 66. The base of transistor 70 will now swing to approximately 4 volts which, in turn, will raise the base of transistor 56 to approximately plus 4 volts, thereby rendering transistor 56 nonconducting and, in turn, unclamping the emitter of transistor 46 from ground. At the same time the collector of transistor 72 will swing to plus 6 volts, thereby restoring the additional 200 microampere flow of positive current into the current summation junction AND gate 90. It can be seen in Example 3 that the emitter of the linear gate transistor 46 is not unclamped from ground until the pre-gate inspection transistor 80 conducts, even though the busy signal input at the OR gate 64 was eliminated while a portion of a data pulse tail was present at the input terminal 10.

The above specification and drawings are not intended to limit the scope of my invention, but are merely for illustrative purposes. The scope of my invention is set forth below in the following claims.

I claim:
1. A pulse gating circuit of the type which is interposed between a source of data pulse signals and pulse signal utilization apparatus for selectively blocking passage of undesired data pulses, comprising:
  gate circuit means having an input terminal for connection to said source and an output terminal for connection to said utilization apparatus, and having a control circuit operative to perform said selective blocking in response to an applied control signal;
  means for supplying said control signal to the control circuit in response to one or more externally supplied logic signals representative of signal processing functions in said utilization apparatus;
  sensing means responsive to said data pulse signals and coupled to said gate circuit means input terminal for providing an auxiliary control effect whenever said data pulse signals from the source are at any level other than a reference level corresponding to complete absence of data pulses;
  means intercoupling said sensing means and said control signal supply means for applying a blocking control signal to said control circuit in response to the simultaneous presence of said auxiliary control effect with any one or more of said logic signals and for maintaining the application of said blocking control signal thereafter until the simultaneous absence of said auxiliary control effect and all of said logic signals.
2. A pulse gating circuit as defined in claim 1 wherein: said control signal supply means is adapted to produce an output control signal in response to
  an input logic signal which is in addition to the externally supplied logic signals from the utilization apparatus;
  wherein said intercoupling means is a feedback circuit responsive to said output signal for providing said additional logic signal to the input of the con- trol signal supply means only during the simultaneous presence of the control effect from the data pulse sensing means thereby maintaining the blocking control signal on the gate circuit means until there is a complete absence of any input data pulse to the gate circuit.

References Cited by the Examiner

UNITED STATES PATENTS

| | | | |
|---|---|---|---|
| 2,775,698 | 12/1956 | Bell et al. | 328—116 |
| 2,862,105 | 11/1958 | Boyer et al. | 328—116 |
| 2,888,557 | 5/1959 | Schnerder. | |
| 2,946,010 | 7/1960 | Tarczy-Hornoch | 328—116 |
| 2,953,694 | 9/1960 | Wilson | 307—88.5 |
| 2,992,411 | 7/1961 | Abbott. | |

ARTHUR GAUSS, *Primary Examiner.*

I. C. EDELL, *Assistant Examiner.*